US011935434B1

(12) United States Patent
Maritato

(10) Patent No.: US 11,935,434 B1
(45) Date of Patent: Mar. 19, 2024

(54) POP-UP PROP MODULE AND APPARATUS

(71) Applicant: Tekky, Orland Park, IL (US)

(72) Inventor: Mitch Maritato, Germantown, WI (US)

( * ) Notice: Subject to any disclaimer, the term of this patent is extended or adjusted under 35 U.S.C. 154(b) by 0 days.

(21) Appl. No.: 18/198,272

(22) Filed: May 16, 2023

(51) Int. Cl.
*G09F 19/08* (2006.01)
*A63H 13/16* (2006.01)

(52) U.S. Cl.
CPC .............. *G09F 19/08* (2013.01); *A63H 13/16* (2013.01)

(58) Field of Classification Search
CPC ........... G09F 19/08; A63H 3/18; A63H 11/06; A63H 13/16; B66F 11/042
USPC ........... 446/308–311, 320, 330; 40/418, 421, 40/470, 601; 248/421
See application file for complete search history.

(56) References Cited

U.S. PATENT DOCUMENTS 862,904 A * 8/1907 Harrison ................. G09F 19/08 40/590
1,323,153 A * 11/1919 Calkins .................... A63H 3/48 446/339
1,401,952 A * 1/1922 Asaturian ................ A63H 1/00 446/262
2,155,300 A * 4/1939 Bybee ........................ G09F 7/00 248/421
3,471,965 A * 10/1969 Glass ..................... A63H 13/16 446/302
3,797,166 A * 3/1974 Murray ..................... A63H 3/48 446/320
11,148,067 B1 * 10/2021 Maritato ............... A63J 19/006

FOREIGN PATENT DOCUMENTS

DE 8528823 * 2/1987 ............... B60Q 7/00
DE 4012459 A * 10/1991 ............... B60Q 7/00

* cited by examiner

*Primary Examiner* — Cassandra Davis
(74) *Attorney, Agent, or Firm* — The Law Offices of Konrad Sherinian, LLC; Jeffrey S. Dixon

(57) ABSTRACT

A scissor pop-up prop module with a stationary base, a scissor linkage, an automation system, and a prop mount for attaching an amusement prop. The scissor linkage articulates in an expansion direction so that the prop mount moves in a linear pop- up direction from a home positions to a displaced position. The automation system suddenly springs the scissor linkage in the expansion direction and then produces gradual controlled movement of the scissor linkage in a contraction direction back to the home position. The prop mount carries a prop mount linkage that is driven to articulate by engagement with the base during a latter phase of pop-up movement of the prop mount from a partially displaced position to the displaced position, to simulate a winged creature spreading its wings as it rises.

17 Claims, 4 Drawing Sheets

POP-UP PROP MODULE AND APPARATUS

CROSS REFERENCE TO RELATED APPLICATIONS

None.

FIELD OF THE DISCLOSURE

The present invention generally relates to an amusement prop apparatus, and more particularly to freestanding amusement prop apparatus that suddenly pops up, accompanied by sounds and/or lights for an amusement effect. Still more particularly, it relates to apparatus that produces such movement and effects in response to detecting motion and/or sound, so as to surprise and amuse a person approaching or passing near the apparatus.

SUMMARY OF THE DISCLOSURE

In accordance with an aspect of the disclosure, a scissor pop-up prop module comprises a base, a scissor linkage, an automation system, and a prop mount. The scissor linkage comprises a plurality of crossed pairs of links connected in series, the links of each crossed pair being pivotally joined at a middle joint along the length of each link of the crossed pair, and each link of the crossed pair having an end pivotally connected to an end of a corresponding link of a successive crossed pair of links by a respective end joint, the middle joints lying on straight line defining an axis of the scissor linkage. The base is adapted and configured to be supported on a flat surface, the scissor pop-up prop module being adapted and configured to be supported by the base on the flat surface. The scissor linkage is articulable from a home position to a displaced position, in an expansion direction and from the displaced position to the home position in a contraction direction, the contraction direction being opposite to the expansion direction. The automation system is operatively connected between the base and the scissor linkage, the automation system being operable to move one of the middle joints relative to the base in an axial pop-up direction so as to cause the scissor linkage to articulate suddenly from the home position to the displaced position in the expansion direction and to move the middle joint relative to the base in an axial return direction so as to cause the scissor linkage to articulate more gradually in the contraction direction, the return direction being opposite to the pop-up direction. The prop mount is connected to the scissor linkage so that such articulation of the scissor linkage in the expansion direction moves the prop mount linearly in the pop-up direction from a home position of the prop mount to a displaced position of the prop mount and so that such articulation of the scissor linkage in the contraction direction moves the prop mount linearly in the return direction from its displaced position to its home position. Optionally, the prop mount is an articulating prop mount including a prop mount linkage that is operatively connected to the base so that the base engages the prop mount linkage so as to drive the prop mount linkage to articulate during movement of the prop mount to the displaced position in the pop-up direction.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skill in the art will appreciate that elements of the figures above are illustrated for simplicity and clarity and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

In the following description of various examples of embodiments of the disclosed systems and methods, reference is made to the accompanying drawings, which form a part hereof, and in which are shown by way of illustration various example devices, systems, and environments in which aspects of the disclosed systems and methods can be practiced. Other specific arrangements of parts, example devices, systems, and environments, can be used, and structural modifications and functional modifications can be made without departing from the scope of the disclosed systems and methods.

Described here and illustrated in the accompanying drawings are pop-up prop modules according to the present disclosure. The prop modules generally include a prop mount movably connected to a base (where the base may be freestanding or adapted and configured to be fastened or otherwise secured or affixed to a stationary support), the module being operative to produce movement of the prop mount relative to the base. The prop mounts are adapted and configured to receive and retain a mounted prop (such as a decorative prop representing an animated being or figure). A pop-up prop module more particularly refers to such a prop module that is operative to produce a sudden rectilinear movement of the prop mount in a "pop-up" direction (which need not literally be "up" in all cases, and in embodiments may be down or even horizontal, particularly when the base is secured to a stationary support), as well as a more gradual movement of the prop mount in a return direction opposite the pop-up direction. Embodiments are more particularly described here as a scissor pop-up prop module 10, illustrated in FIGS. 1-4, and a pop-up articulating prop module 10', illustrated in FIGS. 4-9. (It will be noted that FIG. 4 is an illustration of an embodiment of a guide assembly 40' that is suitable for inclusion in a pop-up prop module as in either illustrated embodiment.)

Figure 1:
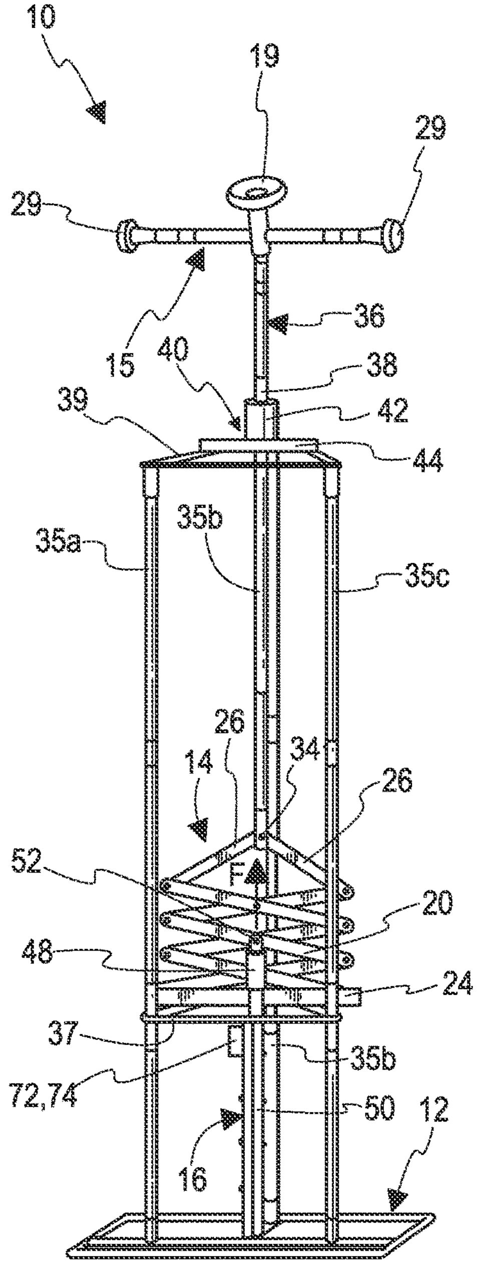
FIG. 1 is top-front-left perspective view of a scissor pop-up prop module according to an embodiment in a home position.
Figure 2:
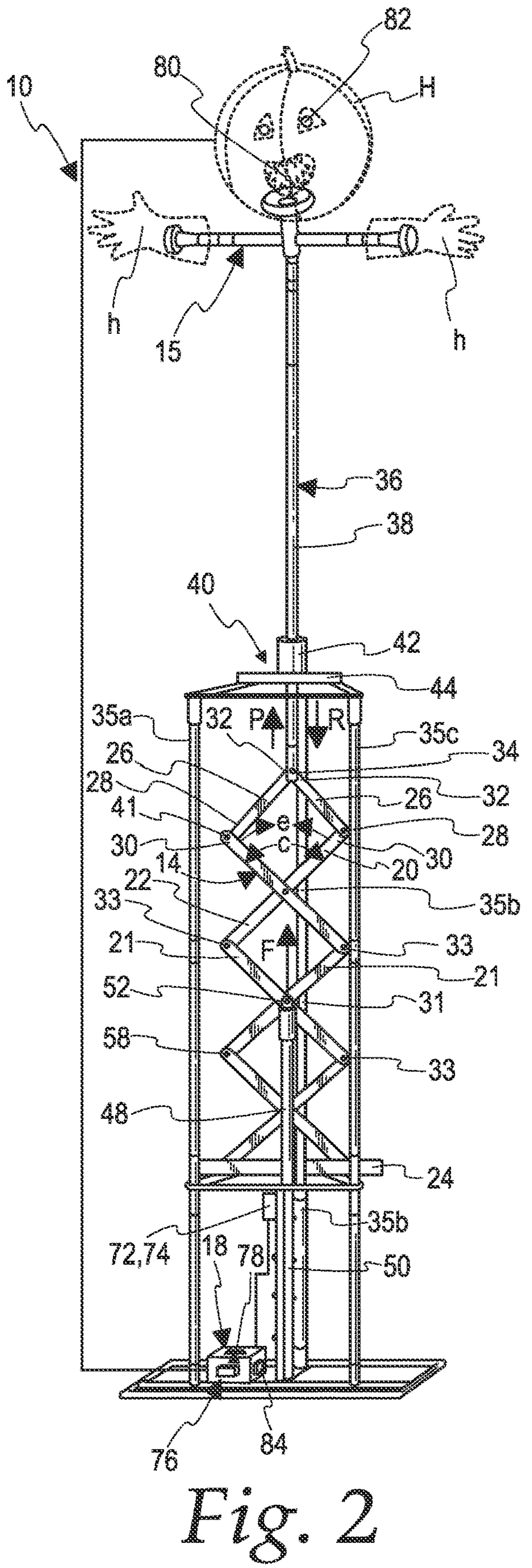
FIG. 2 is a top-front-left perspective view of the prop module of FIG. 1 in an extended position.
Figure 3:
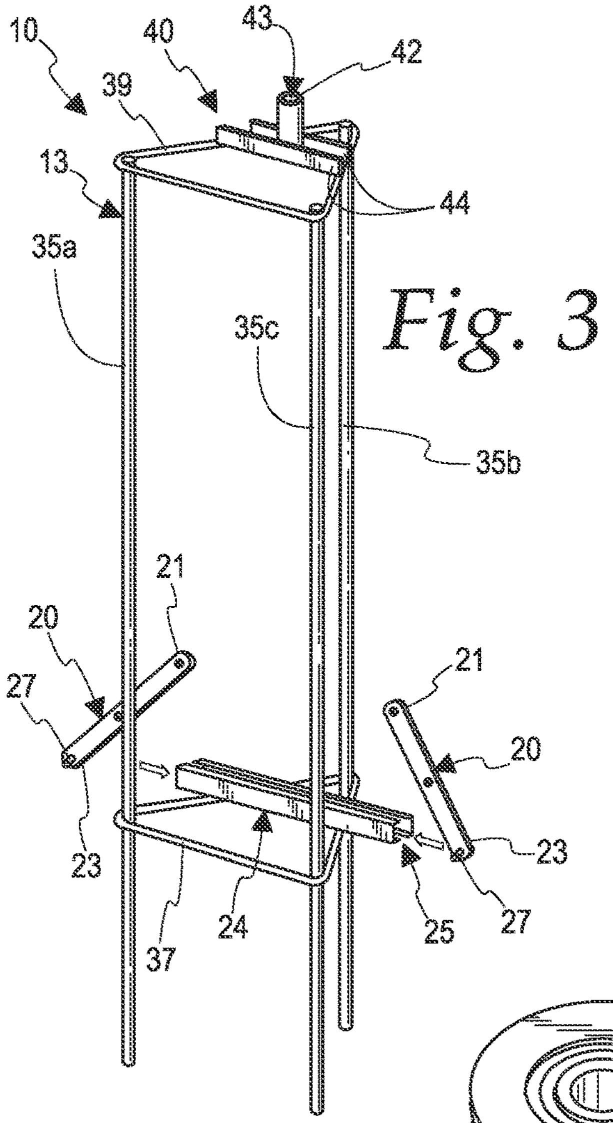
FIG. 3 is a top-front-left exploded perspective view of a portion of the prop module of FIG. 1.
Figure 4:
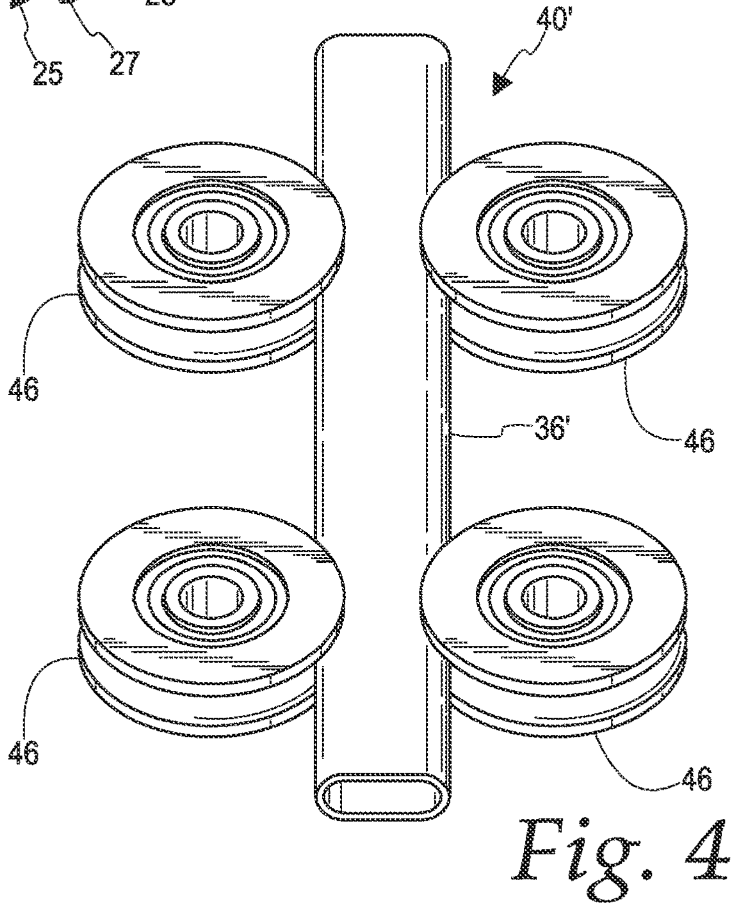
FIG. 4 is a front perspective view of an embodiment of a spine pole guide assembly for a prop module.

Turning to FIGS. 1-3, the scissor pop-up prop module 10 comprises a base 12; a scissor linkage 14 that includes a plurality of movable links connected to the base 12; a prop mount 15 connected to the scissor linkage 14; an automation system connected to the scissor linkage 14 (the automation system being embodied as an integral automation module that is illustrated and described here as the extension module 16); and an electrical system 18 that is operative to supply power to the extension module 16, as well as to power sounds and lights in a programmed sequence coordinated with movement of the prop mount 15 as the scissor linkage 14 is articulated. The scissor linkage 14 is articulable from a home position to a displaced position in a expansion direction e and from the displaced position to the home position in a contraction direction c, the pop-up and return directions of articulation being as indicated in FIG. 2. The extension module 16 is operative to produce such expansion articulation e of the scissor linkage 14 from the home position to the displaced position suddenly, and to produce more gradually such contraction articulation c of the scissor linkage 14 from the displaced position to the home position. In turn, the scissor linkage 14 is operatively connected to the prop mount 15 so that its articulation in the expansion direction e produces linear translation of the prop mount 15 in a pop-up direction P indicated in FIG. 2 (in the illustrated case, upward), while its articulation in the contraction direction c produces linear translation of the prop mount 15 in a return direction R indicated in FIG. 2 (in the illustrated case, downward).

The base 12 is adapted and configured to be supported on a support, the scissor pop-up prop module 10 being adapted and configured to be supported by the base 12. Specifically, the base 12 is a frame structure that is adapted and configured to rest or be secured and held stationary during normal operation of the scissor pop-up prop module 10, on a generally horizontal support surface (not shown), such as that of an indoor or outdoor floor, deck, patio, tabletop or countertop, grass lawn, driveway, street, sidewalk, or the like. More particularly, the base 12 is adapted and configured so that the apparatus 10 is freestanding on such a horizontal support surface when the scissor linkage 14 is at rest. Suitable fasteners or weights (e.g., sandbags, not shown) can be used to secure the base 12 on such a support surface, so as to restrain the base from tipping or shifting when the scissor linkage 14 is in motion. Other suitable supports on which an apparatus according to the present disclosure may be supported may include non-horizontal supports, such as a wall, column, or upright member(s) of a frame structure, to which a base, such as the base 12 and/or a differently adapted and configured base of another embodiment, may be secured. Other suitable bases may be adapted and configured to be movably supported on a support. For example, in other embodiments of a scissor pop-up prop module according to the present disclosure, a base may be movably supported on a generally horizontal support surface by wheels, casters, bi- or omnidirectional rollers, runners, or glides.

In the illustrated embodiment, the prop mount 15 comprises a head mount 19 and a pair of hand mounts 29, which are operative to receive a respective head prop H and hand props h attached thereto by a suitable method. Preferably, the head and hand props H, h are attached to the respective head and hand mounts 19, 29 so as to be removable therefrom for disassembly of the scissor pop-up prop module 10. In some embodiments, a prop is included with a draped piece of fabric (not shown), which may represent a cloak or other garment of the prop figure, while also surrounding the apparatus on all sides. Such a draped piece of fabric can serve to hide its mechanical and electrical components, so as to enhance the surprise effect when the linkage pops up to the displaced position, causing sudden upward movement of the prop. In embodiments, the draped piece of fabric is draped over the prop mount 15 so as to be disposed below the head prop H and inwardly of the hand props h. In more particular embodiments, a fabric spreading member (not shown) is affixed to the prop mount 15 so as to shape a top end of the garment into a simulated shoulder and chest shape and to expand the periphery of a hanging portion of the garment, so as to give the impression of a bulky body occupying the garment, while at the same time spacing the garment outwardly away from the frame uprights The scissor linkage 14 comprises a vertically stacked series of pairs of crossed links 20, each pair of crossed links 20 being pivotally connected at an intermediate point along the length of each by a middle joint 31, and successive crossed link pairs 20 comprising upper ends 21 of a lower crossed link pair 20 pivotally connected to respective lower ends 22 of an upper crossed link pair 20 by respective end joints 33. The middle joints 31 lie on a straight line defining an axis of the scissor linkage 14. A bottom pair of the crossed links 20 have lower ends 23 that are movably retained by a horizontal track 24. In particular, the lower ends 23 of the bottom pair of crossed links 20 are connected to the track 24 so as to allow the lower ends 23 to pivot and move horizontally relative to the track 24. As best seen in FIG. 2, the scissor linkage 14 further includes a pair of top terminal links 26, the top terminal links 26 having lower ends 28 that are pivotally connected to upper ends 30 of pair of the crossed links 20 at top terminal end joints 41 and upper ends 32 that are pivotally connected to each other at an apex joint 34 of the scissor linkage, the apex joint 34 being aligned vertically with the middle joints 31 and thus positioned on the axis of the scissor linkage 14. It will be appreciated that the scissor linkage 14 is thereby adapted and configured so that its articulation in the expansion direction e produces linear translation of each of the middle joints 31 and of the apex joint 34 in the pop-up direction P (that is, upward, as indicated in FIG. 2), while its articulation in the contraction direction c produces linear translation of the middle joints 31 and apex joint 34 in the return direction R (that is, downward, as indicated in FIG. 2). Further, it will be understood that an input of such linear translation of any of its middle joints 31 or the apex joint 34 in the pop-up and return directions P, R relative to a vertically fixed lower end of the scissor linkage 14 will result in the corresponding articulation in the expansion and contraction directions e, c, which in turn will produce as outputs linear translation of each of the other middle joints 31 and apex joint 34 in the same linear direction, each of them by a greater distance the farther removed it is from the vertically fixed lower end. In this manner, an input translation of one of the middle joints 31 produces an amplified output translation of each higher middle joint 31, and the most amplified output translation of the apex joint 34.

As illustrated, each of the crossed links 20 is parallel to its opposite counterpart in the next higher and or next lower pair(s) of crossed links 20, whereas each of the top terminal links 26 is inclined at a slightly greater angle from horizontal than its opposite counterpart in the top pair of crossed links 20, being slightly more than half as long as the latter. In other embodiments, each pair of links 20, 26 can be parallel to the next higher and/or lower pair(s), so that all the links 20, 26 have the same angle of inclination from horizontal. In the illustrated embodiment, each middle joint 31 is disposed at the midpoint of the respective length of each of the crossed links 20 that it joins. In other embodiments, the middle joints can be at other positions along the lengths of the respective pair of crossed links, provided that the middle joints collectively lie in a straight line.

As shown in FIGS. 1 and 2, the prop mount 15 includes a spine pole 36, the spine pole 36 being pivotally connected to the top terminal link pair 26 of the scissor linkage 14 at the apex joint 34. The spine pole 36 comprises a generally straight elongate vertical section 38 of the prop mount 15 that is movably retained in a guide assembly 40, the guide assembly 40 being affixed to the base 12.

In FIG. 3, a partial exploded perspective view of the module 10 is provided, showing the construction of a frame subassembly 13 of the base 12. The frame subassembly 13 has a generally polygonal plan profile, having elongate vertical uprights disposed at the corners of the polygonal shape, which is more particularly a triangle as illustrated in FIGS. 1-3. An elongate vertical upright 35*a*, 35*b*, 35*c* is disposed at each corner of the triangle. The spacing and parallel orientation of the uprights 35*a*, 35*b*, 35*c* is maintained by each upright 35*a-c* being affixed to an inside corner of each of a triangular lower frame ring 37, which supports the track 24, and a triangular upper frame ring 39, which supports the guide assembly 40.

The track 24 comprises elongate channel members that are affixed to the base 12 so as to define a channel 25 that extends parallel to a plane of articulation of the scissor linkage 14, the channel members having similar C-shaped cross sections, with open sides facing each other and spaced apart so as to define an open slot between them, through which the lower ends 23 of the bottom pair of crossed links 20 extend. A sliding pin or roller 27 is connected to each of the lower ends 23 so as to protrude out of the plane of articulation of the scissor linkage 14 into the interior of at least one of the C-shaped channel member cross sections, so as to be retained therein, with freedom of movement limited to rotation and horizontal translation along a length of the track 24.

The guide assembly 40 comprises a hollow guide tube 42 that forms a hollow guide channel 43 extending therethrough in the direction of the scissor linkage axis (i.e., vertically in the illustrated embodiment as shown in FIG. 3). The guide tube 42 is connected between pair of mounting members 44, the mounting members 44 being connected to a top side of the upper frame ring 39. In this manner, the guide tube 42 is affixed to the base 12 so as to receive the straight vertical section 38 of the spine pole 36 and to guide and/or stabilize its rectilinear movements in the pop-up and return directions. In an embodiment, the guide tube 42 comprises a linear ball bearing sleeve, which includes a plurality of ball components (not shown) retained within its cylindrical wall so as to be in rolling contact with the spine pole 36 in the guide channel 43. Another embodiment of a guide assembly 40' is illustrated in FIG. 4. The guide assembly 40'comprises opposed guide rollers 46 (illustrated as two pairs of opposed guide rollers, although other embodiments include only an single pair of guide rollers) that are adapted and configured to retain a spine pole 36' having a cross sectional shape fitting a peripheral channel shape of the guide rollers 46. In another embodiment of a pop-up prop module, the guide assembly 40' can be substituted for the guide assembly 40, for example by connecting the guide rollers 46 to mounting members analogous to the mounting members 44 and substituting the spine pole 36' for the spine pole 36.

As noted above, the scissor linkage 14 is articulable in a expansion direction e from a home position to a displaced position and in a contraction direction c from the displaced position to the home position, as indicated in FIG. 2. The home position of the scissor linkage 14 is illustrated in FIG. 1, and the displaced position of the scissor linkage 14 is illustrated in FIG. 2. In the illustrated embodiment, the home position is a bottom position of the scissor linkage 14, in which the scissor linkage 14 is at its most vertically compact, and the spine pole 36 and prop mount 15 are at their lowest positions relative to the base 12 over the range of articulation of the scissor linkage 14. In turn, the displaced position is a top position of the scissor linkage 14 in which the spine pole 36 and prop mount 15 are most elevated above their lowest positions. In other embodiments not shown, particularly those in which a base is supported on a wall or other vertically oriented support and a scissor linkage is oriented in a horizontal plane of articulation, a home position of a linkage may be a position in which a prop mount is closest to the wall, and a displaced position of the linkage that in which the prop mount is at its corresponding highest or lowest position. In embodiments, a top (or otherwise fully displaced/extended) position of a scissor linkage is determined by a stop constraint of an automation system, while in other embodiments, it is determined by a stop constraint of a scissor linkage itself, such as the upper (or distal) ends of a crossed pair of links abutting the lower (or proximal) ends of their parallel counterparts in a next higher (or next farther from a base) crossed pair of links, so as to obstruct further pop-up/extending articulation. In the illustrated embodiment, the top position of the scissor linkage 14 is reached when an extension rod 48 "tops out" in a cylinder 50 of the extension module 16, explained in more detail below.

The extension module 16 comprises a telescoping assembly of an elongate extension rod 48 and an elongate cylinder 50. The extension rod 48 is retained by the cylinder 50 so as to be extendable out of and retractable into the cylinder 50 in opposed extending and retracting directions, respectively, the extending and retracting directions being aligned with a longitudinal axis of the extension module 16. A lower end of the cylinder 50 is connected to the base 12, and an upper end of the extension rod 48 is connected to a drive pin 52 at the center pivotal joint of one of the pairs of crossed links As the extension rod 48 is driven by the extension module 16 to extend upwardly from the cylinder 50, the drive pin 52 is forced upwardly, which in turn pulls the pins or rollers 27 upwardly against the track 24 so as to drive the bottom pair of crossed links 20 to pivot inwardly toward a vertical orientation, in turn driving like articulation of the successively higher pairs of links 20, 26, with the effect that upward travel of the drive pin 52 produces a significantly greater distance of upward travel of the apex joint 34.

Accordingly, the scissor linkage 14 being connected between the extension module 16 and the spine pole 36/prop mount 15 operates to amplify the input displacement of the extension rod 48, so that a prop mounted to the prop mount 15 jumps up a dramatic distance.

In other embodiments, in lieu of a bottom pair of crossed links of a scissor linkage being connected to a track affixed to a base in the above-described manner, a pair of bottom terminal links (not shown), analogous to the top terminal links 26, is provided. Such a bottom terminal pair of links are connected by a bottom pivotal joint to a base (analogously to the top pivotal joint 34 connecting the top terminal links 26 to the spine pole 36). In this manner, upward translation of a middle joint above the bottom pivotal joint causes medially inward rotation of the bottom terminal pair of links and of the bottom pair of crossed links, resulting in articulation of the entire scissor linkage in the expansion direction. Conversely, instead of an upper end of a scissor linkage being connected to a prop mount by top terminal links and an apex joint, a top pair of crossed links can have upper ends retained in a track analogous to the track 24 described above, but which, instead of being affixed to a base and therefore stationary, is affixed to a bottom end of a prop mount connected to the base for vertical travel, so that the track itself travels up and down with the prop mount. In still other embodiments, the top and bottom ends of a scissor linkage are each connected by such a track, to a vertically travelling prop mount and to a stationary base, respectively.

Illustrated in FIGS. 5-9 is an pop-up articulating prop module 10' according to another embodiment. The prop module 10' comprises an articulating prop mount 15' as illustrated in detail in FIGS. 5-7. The prop module 10' further includes a suitable freestanding base 12' and an automation system (not shown) connected between the articulating prop mount 15' and the base 12' so as to be operative to drive sudden movement of the articulating prop mount 15' in a pop-up direction from a home position (illustrated in FIGS. 5 and 8) to a displaced position (illustrated in FIGS. 7 and 9) and more gradual movement of the articulating prop mount 15' in a return direction from the displaced position to the home position relative to the base 12'. In an embodiment of the pop-up prop module 10', the automation system and a scissor linkage (not shown) are connected in series between the base 12' and the prop mount 15', analogously to the scissor pop-up prop module 10. In a more particular embodiment, the prop mount 15' is substituted for the entire portion of the prop module 10 that extends above the guide assembly 40, including the corresponding portion of the spine pole 36 and the prop mount 15, by directly connecting the bottom end of a body member 54 of the prop mount 15' to a cross-section of the spine pole 36 that is just above the guide assembly 40 of the prop module 10 in the position shown in FIG. 1, and by connecting an upright **35*b*' of the base 12' so as to extend above the upright 35*b* of the base 12, as described in more detail below. In another embodiment of the prop module 10', the automation system comprises the extension module 16 or similar, connected directly (without intervening linkage) between the base 12' and the body member 54**.

Figure 7:
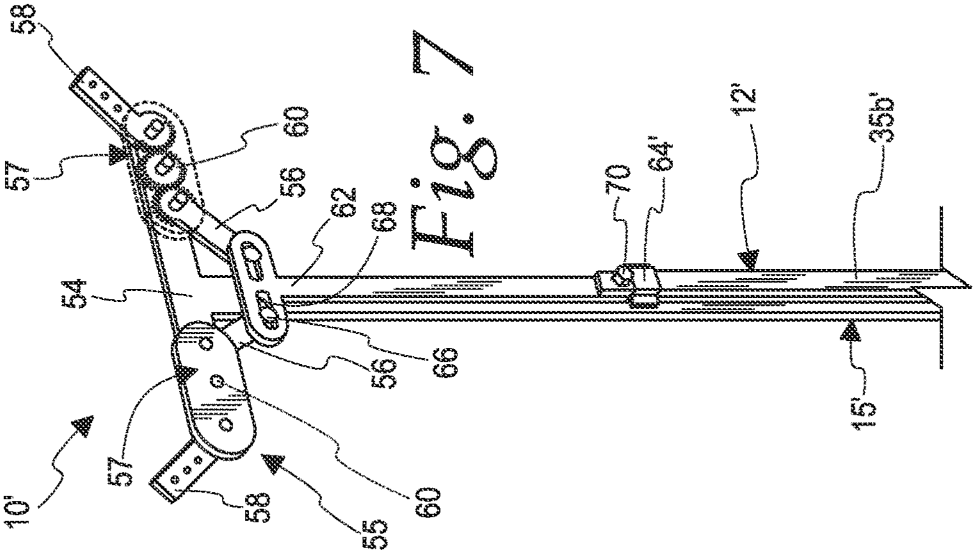
FIG. 7 is a view of the subassembly of FIG. 5 in a fully displaced position and an unfolded state of articulation.
Figure 6:
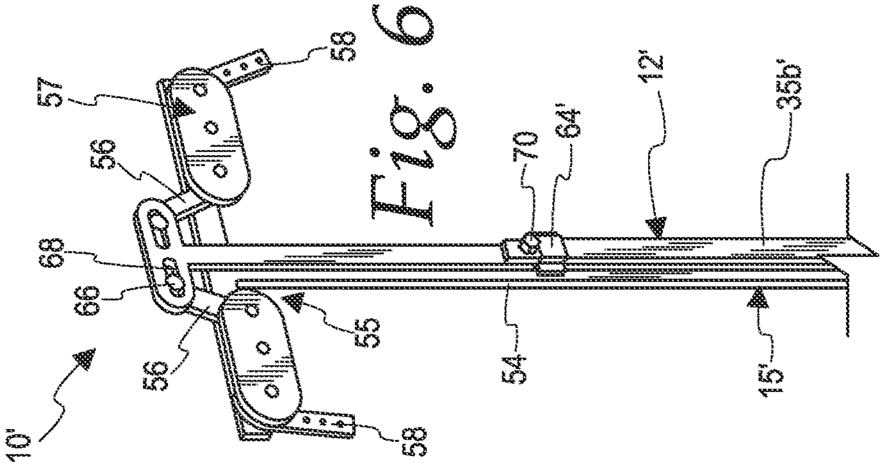
FIG. 6 is a view of the subassembly of FIG. 5 illustrating the secondary linkage subassembly in a partially displaced position and the folded state of articulation.
Figure 5:
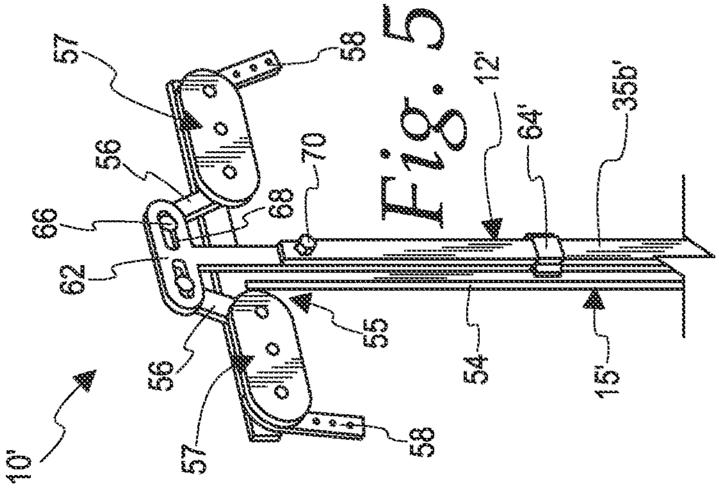
FIG. 5 is a truncated rear-top-left perspective view of another embodiment of a prop module, illustrating a secondary linkage subassembly in a home position and a folded state of articulation.
Figure 9:
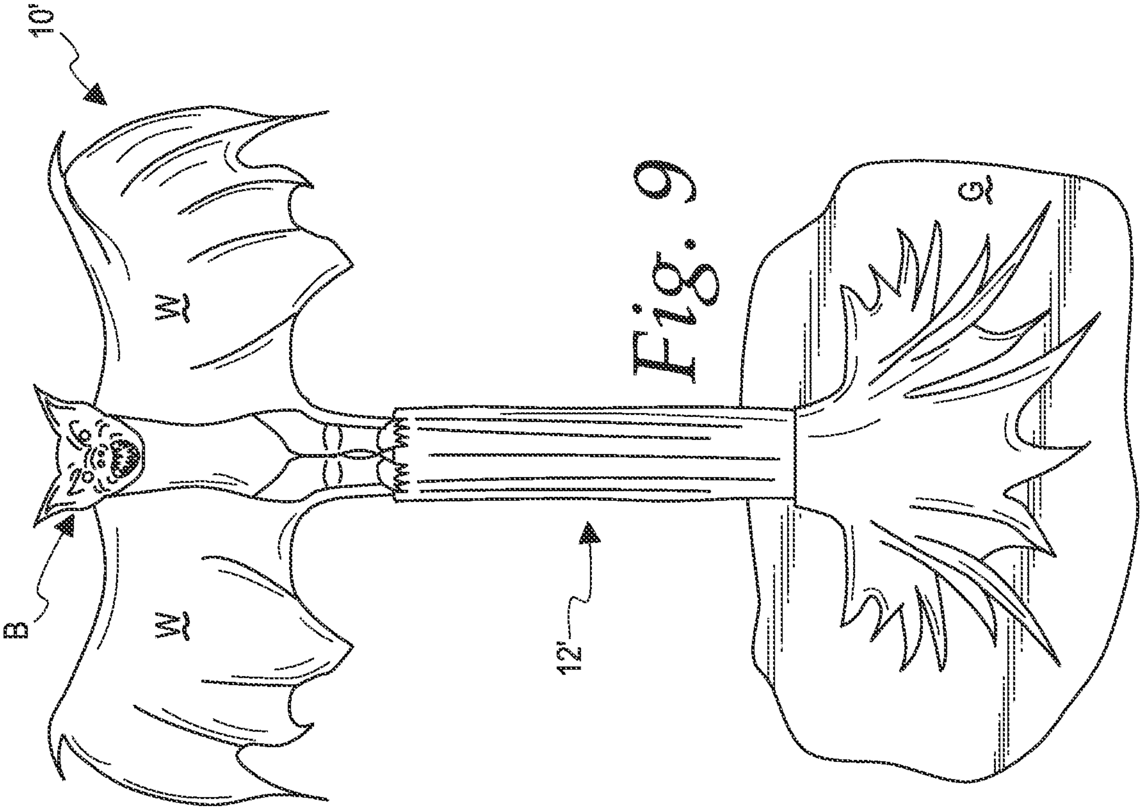
FIG. 9 is a full schematic front elevation view of the winged prop figure mounted to a prop module as in FIG. 8, illustrating the winged prop figure in a fully displaced position with wings spread.
Figure 8:
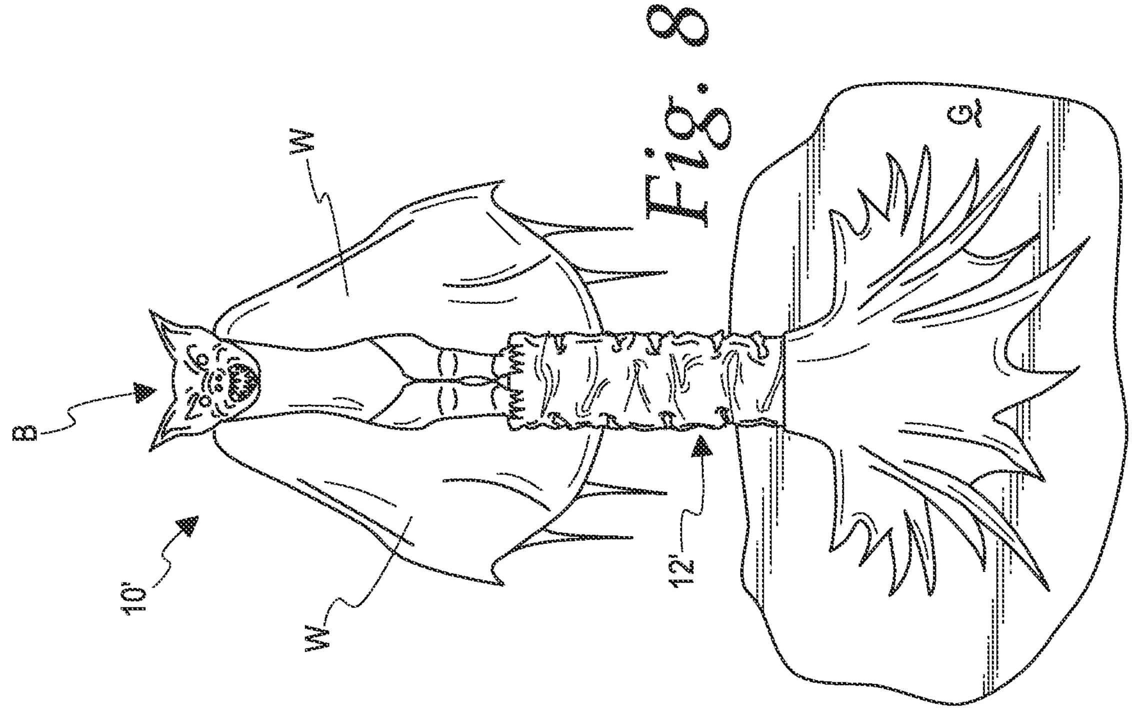
FIG. 8 is a full schematic front elevation view of a prop apparatus including a winged prop figure mounted to a prop module according to the embodiment illustrated in FIGS. 5-7, illustrating the winged prop figure in a home position with wings folded.

As mentioned above, the base 12' comprises the upright **35*b*', a truncated upper portion of the upright 35*b*' being shown in FIGS. 5-7, and is operative to support the pop-up prop module 10' on a stationary support. In the illustrated embodiment, the base 12' is freestanding on a horizontal floor or ground surface G, as indicated in FIGS. 8-9, showing a fully assembled prop apparatus that uses the pop-up prop module 10' to animated a prop figure of a bat B with articulating wings W. The structure of the base 12'of the pop-up articulating prop module 10' can be the same or substantially the same as that of the base 12 of the scissor pop-up prop module 10. Thus, in an embodiment, the base 12' comprises the base 12 of the scissor pop-up prop module 10 wherein the rear upright 35*b* of the base 12, or a portion or extension of the rear upright 35*b*, serves as the upright 35*b*' of the base 12'**.

The articulating prop mount 15' includes the body member 54 and a prop mount linkage 55, the linkage 55 comprising links movably connected to the body member 54. More particularly, the linkage comprises at least one input link 56 movably (and more particularly pivotally) connected to the body member 54 and an output link 58 for each input link 56, the output link 58 likewise being movably (and more particularly pivotally) connected to the body member 54. The input link 56 is operatively connected to the output link 58 so that an input (pivotal) movement of the input link 56 relative to the body member 54 drives an output (pivotal) movement of the output link 58 relative to the body member 54.

More particularly, each input link 56 is connected to the respective output link 58 via a transmission 57. As shown in FIG. 7, the transmission 57 comprises a geartrain wherein the input link 56 and the output link 58 each have a respective partially toothed periphery, and a spur gear is 60 is rotatably connected to the body member 54 so as to be meshed with the partially toothed periphery of each, so that rotation of each input link 56 produces opposite rotation of the respective spur gear 60, rotation of the spur gear 60 in turn producing opposite rotation of the corresponding output link 58, so that the output link 58 rotates in the same direction as the input link 56. More particularly, the illustrated embodiment of the prop mount 15' comprises two such input links 56 and two such output links 58, each driven by a respective one of the input links 56.

In turn, each input link 56 is operatively connected to the base 12' so that, when the body member 54 is displaced in an upward pop-up direction relative to the base 12'from a home position shown in FIG. 5 to a displaced position shown in FIG. 7 the base 12' engages the input link 56 so as to drive said input movement of the input link 56 relative to the body member 54, in turn driving the output movement of the corresponding output link 58. Still more particularly, each input link 56 is operatively connected to the base 12' so that the base 12' initially engages the input link 56 when the body member 54 reaches a partially displaced position, shown in FIG. 6, during a pop-up stroke of its movement, as will be explained as follows.

As illustrated, the prop mount linkage 55 further includes an actuator yoke 62. The actuator yoke 62 is connected to the upright **35*b*' of the base 12' by a sliding collar 64 to permit linear movement of the actuator yoke 62 relative to the base 12' in said pop-up and return directions. In addition, the actuator yoke 62 is connected by a slider-crank joint to each input link 56 (illustrated as a pin 66 on each input link 56 being retained in a horizontal slot 68 of the actuator yoke 62) in such a manner that upward movement of the body member 54 relative to the actuator yoke 62 causes the input links 56, each of which is initially inclined at an upward angle in medial direction toward the other as shown in FIGS. 5 and 6, to pivot downwardly relative to the body member 54 to a downward medial angle as shown in FIG. 7. In the illustrated embodiment, the actuator yoke 62 is freely suspended from the input links 56 by its slots 68, the actuator yoke 62 being light enough so that its weight alone does not drive the input movement of the input links 56. Thus, the actuator yoke 62 is simply carried upward with the body member 54 relative to the base 12', driven by the pop-up stroke of the automation system, until the sliding collar 64 of the actuator yoke 62 initially abuts an actuating stop 70 formed on the upright 35***b*', in the position shown in FIG. 6. At this point, the body member 54 continues to be driven upwardly while the actuator yoke 62 is held stationary relative to the base 12', thereby transmitting the aforementioned input force from the base 12' to the input links 56, causing the input links 56 to slide and pivot relative to the actuator yoke 62 so as to produce their input movement and the output movement of the output links 58. As illustrated in FIGS. 6 and 7, the input links 56 initially extend medially upward from their respective pivot points and are rotated to point medially downward during a second phase of the pop-up stroke beginning at the position shown in FIG. 6 and ending at the position shown in FIG. 7. At the same time, the output links 58, which initially point laterally (i.e., outwardly) downward as shown in FIG. 6, are thus rotated to point laterally upward to the position shown in FIG. 7, with the effect of spreading the wings W of a bat figure B mounted on the pop-up prop module 10', as illustrated in FIG. 9.

Automation systems for driving a pop-up prop module according to the disclosure will now be described in greater detail, with particular reference to the illustrated embodiment of an extension module 16 as an example of an integrated automation module that comprises such an automation system. Although the extension module 16 is only shown for the embodiment of a scissor pop-up prop module 10 as shown in FIGS. 1 and 2, it will be understood that an automation system of the pop-up articulating prop module 10' can likewise include the extension module 16, which can, for example, be connected between the base 12' and the articulating prop mount 15' either directly or in series with a scissor linkage analogous to the scissor linkage 14. A suitable automation system includes a springing mechanism operative to produce sudden articulation of a linkage in a lunging direction for a surprise effect, a motive device operative to produce more gradual articulation of the linkage in a return direction, and a transmission operative to transmit movement from the motive device to the linkage. In embodiments, the springing mechanism and the motive device are separate mechanisms, the transmission is engageable and disengageable, such as by a suitable clutch mechanism, and, when engaged, the transmission is operative to restrain or substantially or wholly prevent articulation not driven by the motive device, including articulation driven by the springing mechanism.

In more particular embodiments, including the illustrated embodiment, the springing mechanism comprises a biasing element that passively stores potential energy, such as a solid mechanical tension, compression, or torsion spring; weights hung from an input crank at a distance from its pivot point relative to a stationary base, to produce a desired biasing torque; or a volume of compressed gas, such as that of a gas spring or a pneumatic actuator. In such embodiments, the motive device is operative to gradually add potential energy to the biasing element by moving a link so as to articulate the linkage in the return direction, and a transmission disengagement mechanism (e.g., a clutch) is operative to release the stored potential energy suddenly by disengaging the transmission so as to decouple the position and movement of the motive device from the position and articulation of the linkage.

In other embodiments of an automation system for a pop-up prop module, a pneumatic component produces folding and lunging articulation of a linkage at desired speeds, omitting an electromagnetic drive motor, a separate spring, and/or a clutch. In one embodiment, a suitable single acting pneumatic air cylinder component (not shown) drives a desired sudden articulation of a linkage when pressurized, while a return force from gravity or a return spring (which may be a separate spring component or part of the air cylinder component itself) reverses the articulation when air pressure is either entirely removed from the air cylinder component or sufficiently reduced to produce a an air cylinder force at a desired level less than that of the return force. In another embodiment, a pneumatic rotary actuator (not shown) drives the desired folding and unfolding linkage articulations, for example, by directly engaging a pivotal joint of the linkage. In another embodiment, a suitable dual acting pneumatic cylinder (not shown), activated by a compressor and a manual or solenoid valve or air switch, drives the desired lunging and return linkage articulations. Optionally, air output from the compressor may be limited by the compressor itself or by a separate pressure regulator. The dual acting pneumatic cylinder may have its speed of extension and retraction controlled by a flow control valve, to control the speed of linkage articulations. The dual acting pneumatic cylinder obviates the need for a brake or clutch, as the cylinder can drive bidirectional movements and can be pressurized rapidly enough to produce sudden “lunging” articulation even if it engages the linkage before it is fully pressurized.

In the illustrated embodiment in particular, a biasing element, motive device, transmission, and clutch of an automation system are embodied in a single integrated automation module, namely, the extension module 16. More particularly, the extension module 16 includes the elongate extension cylinder 50, the extension rod 48 movably mounted within the extension cylinder 50, the biasing element (not shown) being housed in the extension cylinder 50, the motive device and transmission being embodied in a drive module 72 mounted to the extension cylinder 50, and the clutch being embodied in a clutch module 74 mounted to the extension cylinder 50. The biasing element is connected between the extension rod 48 and cylinder 50 so as to bias the extension rod 48 to extend linearly from the cylinder 50. The drive module 72 is operative to transmit controlled movement of the motive device through the transmission to move the extension rod 48 relative to the extension cylinder 50, as well as to hold the extension rod 48 in place against a biasing force from the biasing element when the motive device is not in motion and the transmission is engaged. The clutch module 74 is operative to engage and disengage the transmission.

More particularly, the drive module 72 comprises an electric motor (hidden) as a motive device and a gear train (hidden) as a transmission, and the clutch module 74 is operative to engage and disengage the transmission by causing a clutch gear to mesh to and un-mesh from the gear train. The clutch module 74 comprises a motor operative to drive an eccentric clutch cam (not shown), which in turn is operative to cause the clutch gear to move axially into and out of plane with another gear of the gear train so as to mesh with and un-mesh from that gear. (A more detailed explanation of suitable drive and clutch modules of an analogous extension module is given in U.S. Pat. No. 11,148,067, the entire disclosure of which is hereby incorporated herein by reference.) As illustrated in FIGS. 1 and 2, the extension cylinder 50 is connected to a bottom portion of the base 12. The extension rod 48 is slidably retained in the extension cylinder 50 so as to be movable in opposed longitudinal extension (up) and retraction (down) directions relative to the extension cylinder 50, and connected at its upper end to the drive pin 52 as described above. The extension rod 48 can have a linear tooth rack (hidden) that meshes with an output gear (hidden) of the drive module 72, so as to be driven by rotation of the output gear when the motive device is in motion and the transmission is engaged.

When the extension module 16 is so connected between the base 12 and the scissor linkage 14, with the transmission disengaged, the biasing element produces a biasing force F to bias the extension rod 48 to drive an input upward displacement of the drive pin 52, biasing the scissor linkage 14 to articulate in a pop-up direction so as to drive an amplified output upward displacement apex joint 34, greater than the input upward displacement.

Conversely, when the drive transmission is engaged and the motive device is in motion in a retraction/return direction, the drive module 72 is operative to rotate the output gear so as to drive the extension rod 48 to retract into the extension cylinder 50 in the retraction direction (down, with respect to FIGS. 1 and 2), in opposition to the biasing force F. This retraction of the extension rod 48 pulls the drive pin 52 downwardly so as to articulate the scissor linkage 14 in the return direction until the scissor linkage 14 reaches the home position with extension rod 48 fully retracted, likewise producing an output return displacement of the apex joint 34 that is amplified compared to an input return displacement of the drive pin 52. In addition, as long as the transmission remains engaged, the drive module 72 is operative to restrain the output gear from rotating when the motive device is not in motion, so that the output gear bears against the linear tooth rack (hidden) so as to oppose the biasing force F and hold the extension rod 48 in its retracted position, thereby holding the scissor linkage 14 in its home position.

According to a system and method of use, the clutch module 74 is operative and operated to disengage the transmission when the scissor linkage 14 is in the home position, that is, when the extension rod 48 is fully retracted, to allow the biasing element of the extension module 16 to drive sudden pop-up articulation of the scissor linkage 14, decoupled from the drive module 72. Conversely, the clutch module 74 is operative and operated to engage the transmission when the scissor linkage 14 is in the displaced position, with the extension rod 48 fully extended, to allow the drive module 72 to drive return articulation of the scissor linkage 14 so as to restore potential energy to the biasing element. However, the clutch module 74 can be capable of engaging and disengaging the transmission at other positions of the extension rod 14 corresponding to other positions of the scissor linkage 14 and can be so operative and so operated according to other methods of use.

In other embodiments of a linkage automated by an extension module, the extension module can be connected between a pair of center pivot joints of a scissor linkage, so that linear extension of the extension rod out of the extension cylinder causes extending/pop-up articulation of the linkage, and so that linear retraction of the extension rod into the extension cylinder, causes retracting/return articulation of the linkage. In still other embodiments, an extension module can be connected to a scissor pop-up prop module linkage so that the directions of scissor linkage articulation produced by its extension and retraction are reversed compared the illustrated embodiment, such as by being mounted to the base above a drive pin instead of below it. Likewise, an extension module that is biased by a biasing element to retract, and driven by a motor to extend, instead of the reverse as in the illustrated embodiment, can be connected to a linkage in either foregoing configuration.

As mentioned above, the scissor linkage 14 is in its home position when the extension rod 48 is fully retracted into the extension cylinder 50. Put another way, the fully retracted position of the extension rod 48 determines the home position of the scissor linkage 14. Conversely, the extension module 16 is typically adapted and configured so that the extension rod 48 at a fully extended position "tops out" against a suitable obstruction of the extension cylinder 50 to prevent its further extension. In embodiments, such topping out of the extension rod 48 can provide the sole mechanical stop limit on the pop-up articulation of a scissor pop-up prop module linkage. In other embodiments, a base can include another mechanical stop, such as a spine pole having a stop flange (not shown) of a larger diameter than a guide tube, so as to prevent further upward movement of the spine pole when the stop flange abuts the guide tube.

As mentioned above, the scissor pop-up prop module 10 further comprises the electrical system 18. (It will be understood that the electrical system 18 or similar can also be incorporated into the pop-up articulating prop module 10' in a manner analogous to that described as follows.) The electrical system 18 includes a suitable power supply 76 (such as a battery, illustrated schematically in FIG. 2), a control board 78, a sensor 80, a light 82 (which may comprise, for example, a light emitting diode), and a sounder 84. The control board 78, sensor 80, light 82, and sounder 84 are operatively connected to the power supply 76, the sensor 80 being adapted and configured to detect an input signal and to transmit a sensor trigger signal to the control board 78 in response to detecting the input signal. The control board 78 is in turn adapted and configured to respond to the trigger signal by causing the clutch module 74 to disengage the transmission of the drive module 72 in response to receiving the sensor trigger signal from the sensor 80. For example, the control board 78 may cause a clutch motor of the clutch module 74 to be energized with current from the power supply 76 so as to rotate a clutch cam to a transmission disengagement position that disengages a clutch gear from a drive geartrain of the drive module 72.

Optionally, the electrical system 18 may include any suitable wired manual trigger (not shown), either in lieu of or in addition to the sensor 80, operable by a user to manually initiate transmission of the sensor trigger signal to the control board 78. A wired manual trigger may, for example, be a footpad (not shown) wrapped in a soft vinyl housing, which transmits vibrations generated by a user stepping on the footpad as a sound signal to a sound sensor associated with the control board 78, where the sound sensor thus signaled by the footpad may comprise the sensor 80 or an additional or alternative sensor not shown. Another type of wired footpad trigger may comprise electrical contact sheets spaced apart vertically by a compressible layer, e.g. foam, similarly wrapped in a soft vinyl housing, the compressible layer having holes through which the sheets come into contact. Other suitable manual triggers may include a hand-operated switch, such as a contact switch or a button.

At some point after the scissor linkage 14 reaches the displaced position, the control board 78 is further adapted and configured to activate the clutch module 74 to engage the drive transmission, to energize the motive device of the drive module 72 with current from the power supply 76 so as to transmit movement from the motive device to the extension rod 48, so as to cause the scissor linkage 14 to articulate in the return direction from the displaced position to the home position, and to cease the supply of energizing current from the power supply 76 to the drive module 72 when the scissor linkage 14 reaches the home position. In addition, in response to the trigger signal the control board 78 is further adapted and configured to energize the light 82 and the sounder 84 with current from the power supply 76, to cause the light 82 and the sounder 84 to produce light and sound effects, such that the light and sound effects coordinate as desired with the movement and positions of the prop members H, h, as determined by the articulation of the scissor linkage 14. Preferably, the light and sound effects are visible and audible to a person of normal, unaided vision and hearing, at a distance of ten feet, and more preferably at a distance of one hundred feet, from the scissor pop-up prop module 10.

The sensor 80 may be adapted and configured to detect any of a variety of suitable input signals as appropriate for a desired application of the scissor pop-up prop module 10. For example, the sensor 80 may be a "human sensor" that is operative to detect a passive infrared radiation (PIR) signal emitted from a person near the sensor 80, so as to surprise the person by triggering the scissor pop-up prop module 10 as the person approaches. In other embodiments, the sensor 80 may be operative to detect an audible sound signal, a visible light signal, a powered infrared signal emitted by a remote control, or a radio frequency signal. For example, the sensor 80 may be adapted and configured to detect a Bluetooth® Low Energy or Bluetooth® Classic signal (or equivalent UHF radio signal) emitted by a user's personal electronic device. Thus, for example, a human user may trigger the scissor pop-up prop module 10 from the user's smartphone or tablet.

The foregoing description of the disclosure has been presented for purposes of illustration and description and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim (s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A scissor pop-up prop module comprising:

a base;

a scissor linkage, the scissor linkage comprising a plurality of crossed pairs of links connected in series, the links of each crossed pair being pivotally joined at a middle joint along the length of each link of the crossed pair, and each link of the crossed pair having an end pivotally connected to an end of a corresponding link of a successive crossed pair of links by a respective end joint, the middle joints lying on straight line defining an axis of the scissor linkage;

an automation system;

a prop mount;

the base being adapted and configured to be supported on a flat support surface, the scissor pop-up prop module being adapted and configured to be supported by the base on the flat support surface;

the scissor linkage being articulable from a home position to a displaced position, in an expansion direction;

the scissor linkage being articulable from the displaced position to the home position, in a contraction direction opposite to the expansion direction;

the automation system being operatively connected between the base and the scissor linkage, the automation system being operable to move one of the middle joints relative to the base in an axial pop-up direction so as to cause the scissor linkage to articulate suddenly from the home position to the displaced position in the expansion direction and to move the middle joint relative to the base in an axial return direction so as to cause the scissor linkage to articulate more gradually in the contraction direction, the return direction being opposite to the pop-up direction;

the prop mount being connected to the scissor linkage so that such articulation of the scissor linkage in the expansion direction moves the prop mount linearly in the pop-up direction from a home position of the prop mount to a displaced position of the prop mount and so that such articulation of the scissor linkage in the contraction direction moves the prop mount linearly in the return direction from its displaced position to its home position;

a guide, the guide being connected to the base, the prop mount having a spine pole, the spine pole comprising a straight elongate section of the prop mount extending in the axial direction, the guide retaining the spine pole so as to guide movement of the spine pole in the pop-up and return directions.

2. The scissor pop-up prop module of claim 1 wherein the guide comprises a hollow guide tube, the guide tube forming a hollow guide channel extending therethrough in the axial direction, the guide tube being affixed to the base, the spine pole being slidingly retained in the hollow guide channel.

3. The scissor pop-up prop module of claim 1 wherein the guide comprises a pair of opposed rollers, the opposed rollers being rotatably connected to the base, the spine pole being retained between the opposed rollers.

4. The scissor pop-up prop module of claim 1 wherein the scissor linkage is adapted and configured to articulate only in a single plane of articulation.

5. The scissor pop-up prop module of claim 4 wherein the plane of articulation of the scissor linkage is a vertical plane when the flat support surface is a horizontal surface.

6. A scissor pop-up prop module comprising:

a base;

a scissor linkage, the scissor linkage comprising a plurality of crossed pairs of links connected in series, the links of each crossed pair being pivotally joined at a middle joint along the length of each link of the crossed pair, and each link of the crossed pair having an end pivotally connected to an end of a corresponding link of a successive crossed pair of links by a respective end joint, the middle joints lying on straight line defining an axis of the scissor linkage;

an automation system;

a prop mount;

the base being adapted and configured to be supported on a flat support surface, the scissor pop-up prop module being adapted and configured to be supported by the base on the flat support surface;

the scissor linkage being articulable from a home position to a displaced position, in an expansion direction;

the scissor linkage being articulable from the displaced position to the home position, in a contraction direction opposite to the expansion direction;

the automation system being operatively connected between the base and the scissor linkage, the automation system being operable to move one of the middle joints relative to the base in an axial pop-up direction so as to cause the scissor linkage to articulate suddenly from the home position to the displaced position in the expansion direction and to move the middle joint relative to the base in an axial return direction so as to cause the scissor linkage to articulate more gradually in the contraction direction, the return direction being opposite to the pop-up direction;

the prop mount being connected to the scissor linkage so that such articulation of the scissor linkage in the expansion direction moves the prop mount linearly in the pop-up direction from a home position of the prop mount to a displaced position of the prop mount and so that such articulation of the scissor linkage in the contraction direction moves the prop mount linearly in the return direction from its displaced position to its home position;

wherein the automation system comprises an automation module including a biasing element, a motive device, and a transmission, further comprising:

the biasing element being operatively connected between the base and the scissor linkage so as to bias the scissor linkage to articulate in the expansion direction;

the motive device and the transmission being operatively connected between the base and the scissor linkage, the transmission being engageable when the scissor linkage is in the displaced position and disengageable when the scissor linkage is in the home position;

the transmission being operative, when engaged, to transmit a movement of the motive device to the scissor linkage, so as to move at least one of the links of the scissor linkage relative to the base, so as to produce articulation of the scissor linkage in the contraction direction, and when disengaged, to free the scissor linkage to be articulated in the expansion direction independently of the movement of the motive device.

7. The scissor pop-up prop module of claim 6, further comprising a prop head and prop hands attached to the prop mount.

8. The scissor pop-up prop module of claim 6, further comprising a control board, a sensor, and a power supply, the control board and sensor being operatively connected to the power supply, the sensor being adapted and configured to detect an input signal and to transmit a sensor trigger signal to the control board in response to detecting the input signal, the control board being adapted and configured to cause the transmission to be disengaged in response to receiving the sensor trigger signal from the sensor, and when the linkage is in the displaced position, to cause the transmission to be engaged, the motive device to be moved, and the transmission to transmit the movement of the motive device to the linkage to cause the linkage to articulate in the contraction direction from the displaced position to the home position.

9. The scissor pop-up prop module of claim 8 wherein the sensor is adapted and configured to detect as the input signal a signal selected from the group consisting of a passive infrared radiation signal emitted from a human near the sensor, a sound signal, a visible light signal, a powered infrared signal emitted by a remote control, and a radio frequency signal.

10. The scissor pop-up prop module of claim 8, further comprising a sounder, the control board being adapted and configured to cause the sounder to produce a sound when the input signal is detected by the sensor.

11. The scissor pop-up prop module of claim 8, further comprising a light source, the control board being adapted and configured to cause the light source to emit visible light when the input signal is detected by the sensor.

12. The scissor pop-up prop module of claim 6, further comprising the transmission including an extension cylinder and an extension rod;

the extension cylinder being mounted to the base;

the extension rod having a length being slidably connected to the extension cylinder to permit movement of the extension rod in opposed first and second longitudinal directions relative to the extension cylinder, the extension rod having a proximal end disposed in the extension cylinder and a distal end pivotally connected to the scissor linkage at the location of one of the middle joints, such that movement of the extension rod in the first longitudinal direction moves the middle joint in the pop-up direction relative to the base, which in turn causes the scissor linkage to articulate in the expansion direction, and such that movement of the extension rod in the second longitudinal direction moves the middle joint in the return direction relative to the base, which in turn causes the linkage to articulate in the contraction direction.

13. The scissor pop-up prop module of claim 12 wherein the first longitudinal direction is a direction of extension of the extension rod out of extension cylinder, and the second longitudinal direction is a direction of retraction of the extension rod into the extension cylinder.

14. A pop-up articulating prop module comprising a base;

an articulating prop mount;

an automation system;

the base being adapted and configured to be supported on a flat surface, the pop-up articulating prop module being adapted and configured to be supported by the base on the flat surface;

the articulating prop mount comprising a body member and a prop mount linkage, the body member being movably connected to the base for rectilinear movement from a home position to a displaced position in a pop-up direction and from the displaced position to the home position in an a return direction opposite to the pop-up direction, the prop mount linkage comprising links that are movably connected to the body member, the links including an input link and an output link, the input link being operatively connected to the output link so that an input movement of the input link relative to the body member drives an output movement of the output link relative to the body member, the input link being further operatively connected to the base so that, when the body member is displaced in the pop-up direction from the home position to the displaced position, the base engages the input link so as to drive said input movement of the input link relative to the body member;

the automation system being operatively connected between the base and the body member, the automation system being operable to move the body member suddenly in a rectilinear pop-up direction from a home position of the body member to a displaced position of the body member and to move the body member more gradually in a rectilinear return direction from its displaced position to its home position, the return direction being opposite to the pop-up direction.

15. The pop-up articulating prop module of claim 14 wherein the input link is operatively connected to the base so that the base initially engages the input link when the body member reaches a partially displaced position, the partially displaced position being removed from the home position in the pop-up direction and removed from the displaced position in the return direction, so as to drive said input movement of the input link relative to the body member during movement of the body member from the partially displaced position to the displaced position in the pop-up direction.

16. The pop-up articulating prop module of claim 15 wherein the prop mount linkage further comprises an actuator yoke, the actuator yoke being connected to input link and slidingly connected to the base for movement in the pop-up and return directions, the actuator yoke being adapted and configured to be carried by the input link in the pop-up direction as the body member moves from the home position to the partially displaced position, the base further comprising an actuating stop, the actuating stop being disposed in the path of movement of the actuator yoke so as to prevent further movement of the actuator yoke in the pop-up direction when the body member is in the partially displaced position, and the actuator yoke being operative to transmit an input force from the actuating stop to the input link so as to drive said input movement as the body member moves further in the pop-up direction from the partially displaced position to the displaced position.

17. The pop-up articulating prop module of claim 14 wherein the pop-up articulating prop module is a scissor pop-up articulating prop module, the scissor pop-up articulating prop module further comprising:

a scissor linkage, the scissor linkage comprising a plurality of crossed pairs of links connected in series, the links of each crossed pair being pivotally joined at a middle joint along the length of each link of the crossed pair, and each link of the crossed pair having an end pivotally connected to an end of a corresponding link of a successive crossed pair of links by a respective end joint, the middle joints lying on straight line defining an axis of the scissor linkage, the pop-up direction being an axial direction, and the return direction being an axial direction opposite to the pop-up direction;

the scissor linkage being articulable from a home position to a displaced position, in an expansion direction;

the scissor linkage being articulable from the displaced position to the home position, in a contraction direction opposite to the expansion direction;

the body member being connected to the scissor linkage so that such articulation of the scissor linkage in the expansion direction moves the body member linearly in the pop-up direction from a home position of the body member to a displaced position of the body member and so that such articulation of the scissor linkage in the contraction direction moves the body member linearly in the return direction from its displaced position to its home position;

the automation system being operatively connected between the base and the scissor linkage, the automation system being operable to move one of the middle joints relative to the base in the pop-up direction so as to cause the scissor linkage to articulate suddenly from the home position to the displaced position in the expansion direction and to move the middle joint relative to the base in the return direction so as to cause the scissor linkage to articulate more gradually in the contraction direction.

* * * * *